United States Patent
Hosein

(10) Patent No.: US 9,916,060 B2
(45) Date of Patent: Mar. 13, 2018

(54) SYSTEM AND METHOD FOR REARRANGING ICONS DISPLAYED IN A GRAPHICAL USER INTERFACE

(75) Inventor: Altaf Hosein, Lake Worth, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 248 days.

(21) Appl. No.: 13/542,396

(22) Filed: Jul. 5, 2012

(65) Prior Publication Data

US 2014/0013254 A1    Jan. 9, 2014

(51) Int. Cl.
*G06F 3/0481* (2013.01)
*G06F 3/0483* (2013.01)
*G06F 3/0486* (2013.01)
*G06F 3/0488* (2013.01)
*G06F 9/44* (2018.01)

(52) U.S. Cl.
CPC ........ *G06F 3/04817* (2013.01); *G06F 3/0483* (2013.01); *G06F 3/0486* (2013.01); *G06F 3/04883* (2013.01); *G06F 3/0481* (2013.01); *G06F 3/0488* (2013.01); *G06F 9/4443* (2013.01)

(58) Field of Classification Search
CPC .... G06F 9/4443; G06F 3/0481; G06F 3/0486; G06F 3/0488; G06F 3/04817; G06F 3/04883; G06F 3/0483
USPC .......................................... 715/765, 769, 702
See application file for complete search history.

(56) References Cited

U.S. PATENT DOCUMENTS

| | | | |
|---|---|---|---|
| 6,781,575 B1 * | 8/2004 | Hawkins et al. | 345/173 |
| 2009/0178008 A1 * | 7/2009 | Herz et al. | 715/840 |
| 2011/0271182 A1 | 11/2011 | Tsai et al. | |
| 2012/0036435 A1 * | 2/2012 | Yang et al. | 715/702 |
| 2012/0084692 A1 * | 4/2012 | Bae | 715/769 |
| 2012/0166987 A1 * | 6/2012 | Kang et al. | 715/765 |
| 2012/0304084 A1 * | 11/2012 | Kim | G06F 3/0486 715/762 |

FOREIGN PATENT DOCUMENTS

EP    2437148    4/2012

OTHER PUBLICATIONS 153 kinds of happy Internet world, "iPhone User Guide: Rearranging Icons (move, delete, group)", Aug. 11, 2011, <URL https://www.youtube.com/watch?v=-r7K4LTbl4A/>, p. 1-9.*
153 kinds of happy Internet world, "iPhone User Guide: Rearranging Icons (move, delete, group)", (Aug. 11, 2011), <URL https://www.youtube.com/watch?v=-r7K4LTbl4A/>, p. 1-22.*
European Patent Office, Extended European Search Report issued in EP Application No. 12185343.6, dated Mar. 5, 2013, 9 pages.
Apple, iPad User Guide for iOS 5.0 Software, dated Oct. 20, 2011, 141 pages.
Office Action issued in Canadian Application No. 2,820,207 dated May 26, 2015; 4 pages.

(Continued)

*Primary Examiner* — Maryam M Ipakchi
*Assistant Examiner* — Mong-Shune Chung
(74) *Attorney, Agent, or Firm* — Fish & Richardson P.C.

(57) ABSTRACT

An electronic device capable of rearranging icons on a graphic user interface is described. The electronic device provides a method that allows icons that are displayed on one of a plurality of pages to be moved from one page to any other page. The icons can be dragged to a page indicator associated with the page it is to be moved to.

14 Claims, 14 Drawing Sheets

(56) References Cited

OTHER PUBLICATIONS

Communication Pursuant to Article 94(3) EPC issued in EP Application No. 12185343.6 dated Feb. 8, 2016.
Apple: "iPad User Guide for iOS 5.0 Software", Apple Inc. Oct. 20, 2011; pp. 1-141.
Summons to Attend Oral Proceedings Pursuant to Rule 115(1) EPC issued in EP Application No. 12185343.6 on Jan. 31, 2017.

* cited by examiner

SYSTEM AND METHOD FOR REARRANGING ICONS DISPLAYED IN A GRAPHICAL USER INTERFACE

TECHNICAL FIELD

The current disclosure relates to a graphical user interface (GUI) for electronic devices, and in particular to rearranging icons in the GUI.

BACKGROUND

Electronic devices provide a graphical user interface (GUI) that allows users to easily interact with the various functionality provided by the electronic device. The GUIs may employ a number of pages for grouping and displaying icons. The icons that are displayed on a page may be arranged in a grid or other pattern. The icons may be program icons that allow a user to select and execute an application or functionality on the electronic device, such as opening a web browser, starting an email application, playing a game or other types of functionality. The icons may alternatively be links or representations to media or other files on the electronic device such as pictures, videos, audio, or other types of files. A user may navigate between the different pages using a touch gesture such as a swipe gesture and then select an icon displayed on the page.

When numerous pages are present, the GUI may include page indicators for indicating which of the pages is currently displayed. To move an icon between pages, for example is when a new application is installed, the icon is placed on the last page. If the user wishes to place the icon on the first page then they must drag the icon across all pages. While the functionality for arranging icons in a GUI is useful for moving icons to adjacent pages, it may be inefficient or cumbersome when multiple pages are defined in the GUI requiring multiple swipes to the next page to move the icon.

Therefore it is desirable to provide additional or alternative functionality for rearranging icons in pages of a GUI.

BRIEF DESCRIPTION OF THE DRAWINGS

The subject matter of the appended claims will be described with reference to the appended drawings, in which:

DETAILED DESCRIPTION

Figure 1:
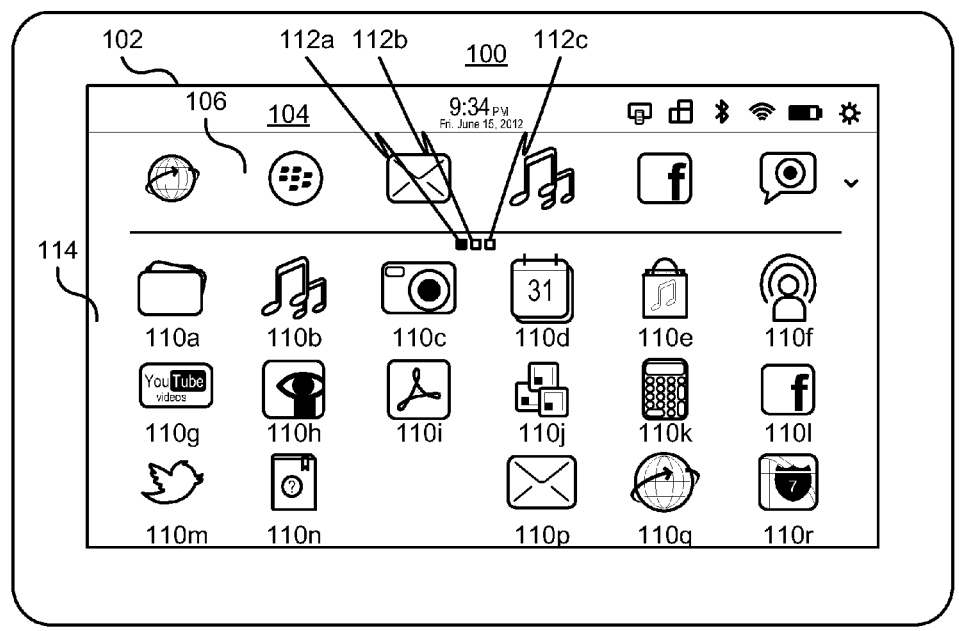
FIGS. 1 to 13 depict illustrative GUI screens in accordance with icon rearrangement in accordance with current description.

In accordance with an aspect of the present disclosure, there is provided a method of rearranging icons between a plurality of pages of a graphical user interface (GUI), each page associated with a respective page indicator displayed in the GUI, the GUI displaying a single page at a time, the method comprising: detecting an initiation of an icon move of a selected icon displayed on a current page; determining a selected page indicator of the plurality of page indicators based on a proximity of a page selection input; and moving the selected icon to the page associated with the selected page indicator.

In accordance with another aspect of the present disclosure, there is provided an electronic device comprising a touch-sensitive display; a processor for executing instructions; and a memory storing instructions, the instructions when executed by the processor configuring the electronic device to provide: a graphical user interface (GUI) comprising a plurality of icons arranged on a plurality of pages, each page associated with a respective page indicator displayed in the GUI, the GUI displaying a single page at a time; and icon rearrangement functionality comprising: functionality capable of detecting an initiation of an icon move of a selected icon displayed on a current page; functionality capable of determining a selected page indicator of the plurality of page indicators based on a proximity of a page selection input; and functionality capable of moving the selected icon to the page associated with the selected page indicator.

In accordance with yet another aspect of the present disclosure, there is provided a non-transitory computer readable medium storing instructions for configuring an electronic device to provide a method of rearranging icons between a plurality of pages of a graphical user interface (GUI), each page associated with a respective page indicator displayed in the GUI, the GUI displaying a single page at a time, the method comprising: detecting an initiation of an icon move of a selected icon displayed on a current page; determining a selected page indicator of the plurality of page indicators based on a proximity of a page selection touch input; and moving the selected icon to the page associated with the selected page indicator.

Touch devices, such as mobile phones, tablet computers, laptop computers, surface computers or other electronic devices having a touch sensitive input device, such as a touch-sensitive display, provide a graphical user interface (GUI) that allows users to interact with the device through touch gestures. As will be appreciated, many different gestures are possible. Examples of touch gestures include a tap gesture consisting of tapping a contact point on the touch screen, a drag or swipe gesture consisting of an initial contact point and hold while sliding the contact point to an end contact point, and a hold gesture consisting of maintaining contact of a contact point for a period of time.

The GUI may provide a display of a plurality of different icons to the user. The icons presented to the user may be for example program icons that allow a user to select an application or functionality to perform. The icons may alternatively provide access to media assets on the device, such as photographs, videos or audio files. Regardless of what the icons are used to represent, they may be displayed in one or more pages. The GUI may display a single page at a time. The pages provide a convenient mechanism for grouping or organizing a plurality of icons together. The GUI allows the different pages to be navigated among, for example using swipe gestures. When the GUI includes multiple pages, the GUI may further include a graphical page indicator that provides an indication to the user of the total number of pages in the GUI as well as which page is currently displayed. Typically this graphical page indicator comprises respective individual page indictors each associated with a respective one of the pages. The individual page indicators may comprise a plurality of different graphical representations, for example one representation may be used to indicate that the associated page is currently displayed, and another representation may be used to indicate that the associated page is not currently displayed.

The icons associated with a particular page may be rearranged within the page, for example by dragging an icon from one location to another in the displayed page. As described further herein, individual icons may also be moved from one page to another. Rather than dragging the icon to be moved to a side of the device in order to move the icon to the adjacent page, the icon may be moved to one of the individual page indicators in order to select one of the page indicators and move the icon to the page associated with the selected page indicator. The page indicator may be highlighted by graphical feedback information to highlight to a user which page is selected when moving the icon and aid in page selection.

The rearrangement of icons in a GUI of a touch screen device will be described further with reference to FIGS. 1 to 18 which depict display screens of the GUI and the touch interactions with the GUI. The touch sensitive device 100 is depicted as being a tablet form factor displayed in landscape orientation although it is contemplated that other form factors and orientations may be used. For example, the icon rearrangement can be applied to a GUI of mobile device providing a portrait orientation such as a Smartphone as described further with reference to FIG. 19. The device 100 includes a touch sensitive display for providing a GUI to a user. As depicted in FIG. 1, the GUI may comprise various graphical components, including a notification bar 104 that may be used to display notifications or other information, such as the date and time, battery status and other information or options to the user. The display may further comprise an application dock or icon tray 106 that displays various icons associated with applications or device functionality that are frequently used by the user. The application dock 106 may be displayed in various positions based upon orientation, or may always be displayed in the same location, or may not always be provided or visible.

As depicted, the page 114 displays a plurality of icons 110a-r. The icons may be displayed in a grid pattern or otherwise arranged within the page 114. An individual page may be associated with more icons than can be displayed at a single time, in which case the icons of the page may be scrolled through. The icons may also be presented as a folder containing one or more icons for the associated applications.

When a page is displayed, the GUI may include page indicators 112a-c that provide an indication of the number of pages, and which of the pages is currently displayed. Three individual page indicators 112a-c are each associated with a respective page. The page indicators 112a-c may include two or more different representations. The first representation may be used to indicate that the associated page is currently displayed. This representation is depicted by page indicator 112a. The second representation may be used to indicate that the associated pages are not currently displayed. Further, the order that the page indicators 110a-c are displayed relative to one another may provide an indication of the order of the associated page.

Figure 2:
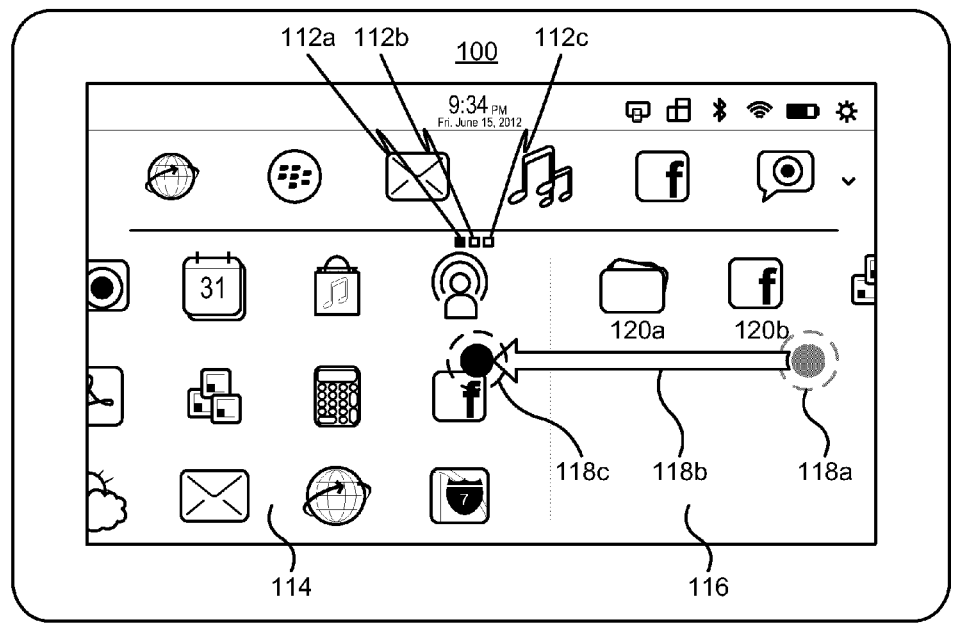
Figure 3:
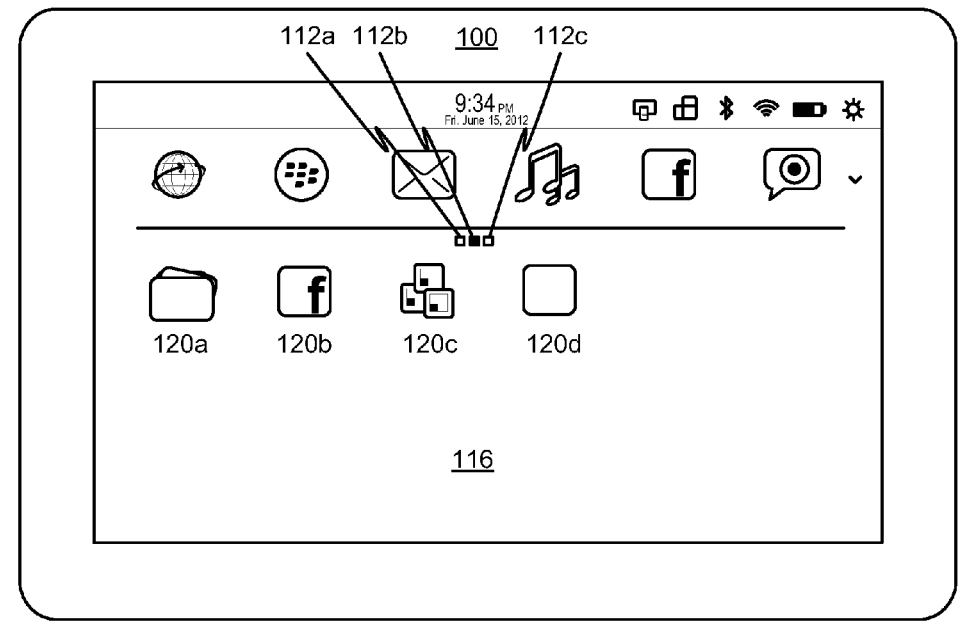

As depicted in FIG. 2, a drag or swipe gesture having a starting point 118a and moving towards the left edge of the device 118b to a lift or end point 118c may cause the GUI to display the adjacent page 116. The adjacent page 116 may be slid in while the currently displayed page 114 is slid out as depicted in FIG. 1. Once the adjacent page 116 is displayed, as depicted in FIG. 3, additional icons 120a-d associated with the page 116 are displayed. Additionally, the page indicators 112a-c are updated to reflect which one of the pages is currently displayed.

Figure 4:
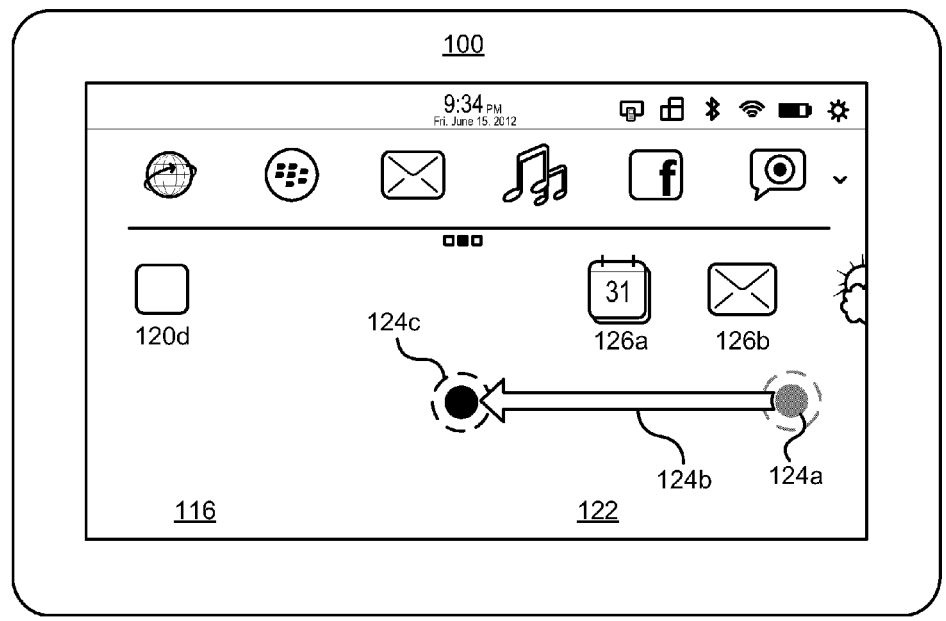

As depicted in FIG. 4, a third page 122 may be navigated to with a drag or swipe touch gesture 124a-c in a similar manner as described above with reference to FIG. 2. The third page 122 and the associated icons 126a-d may be displayed along with the updated page indicators 112.

Figure 5:
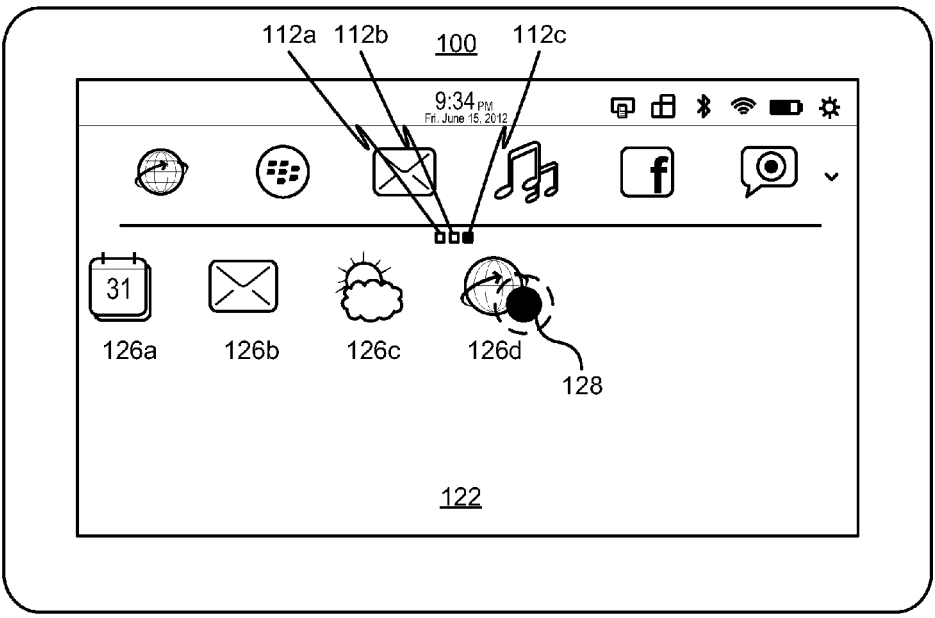
Figure 6:
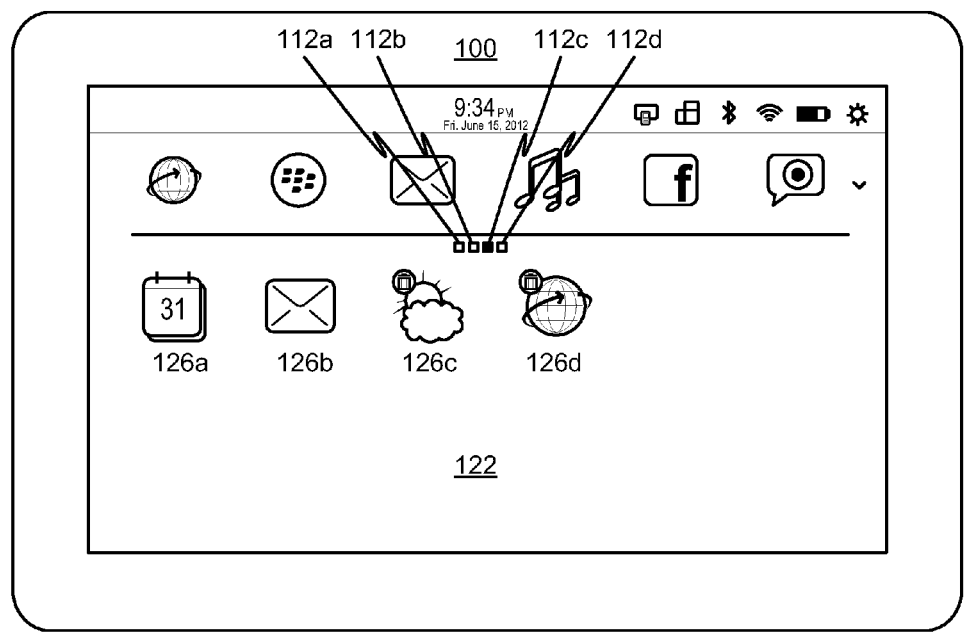

When one of the pages is displayed, it is possible to enter a rearrangement mode that allows icons to be dragged and rearranged, both in the same page and between pages. As depicted in FIG. 5, the rearrangement mode may be entered by a tap and hold gesture 128. It is contemplated that the rearrangement mode may be entered in other ways, including specific gestures or through menu or option selections. When a user holds a tap gesture on an icon for a length of time above a threshold, the rearrangement mode is entered and the graphical representation of the icons may be adjusted to indicate that the GUI is currently in the rearrangement mode. As depicted in FIG. 6, one or more of the icons may be modified with additional graphics, for example with a trash can providing a way for deleting an icon. It is noted that certain icons may be protected from deletion such as built in calendar and email applications.

Additionally, when the GUI enters the rearrangement mode an additional blank page can be added to the end of the pages, as indicated by page indicator 112d. The blank page may be used to rearrange the icons.

Figure 7:
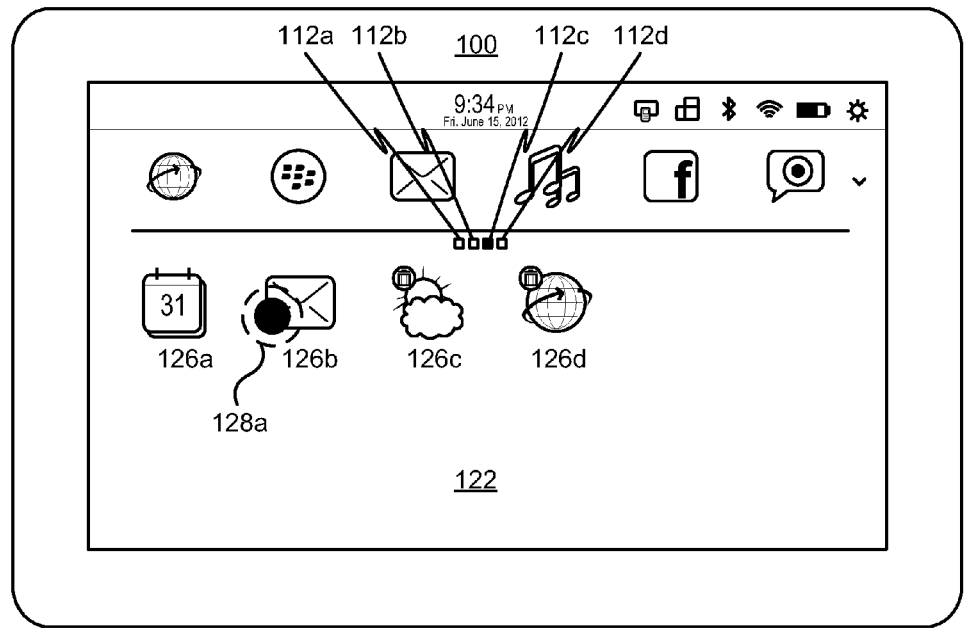
Figure 8:
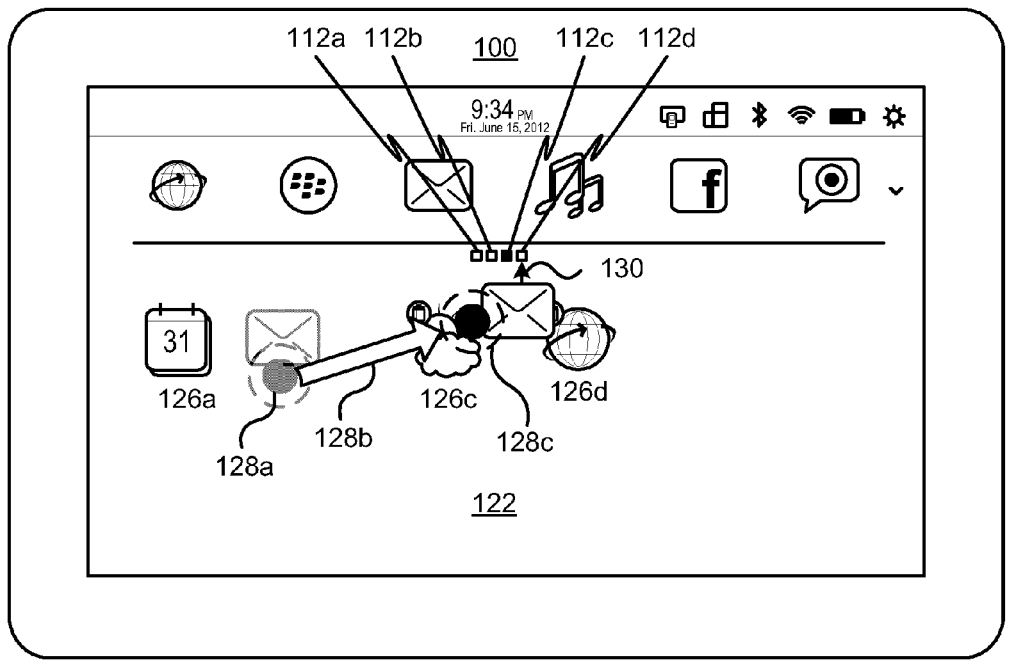
Figure 9:
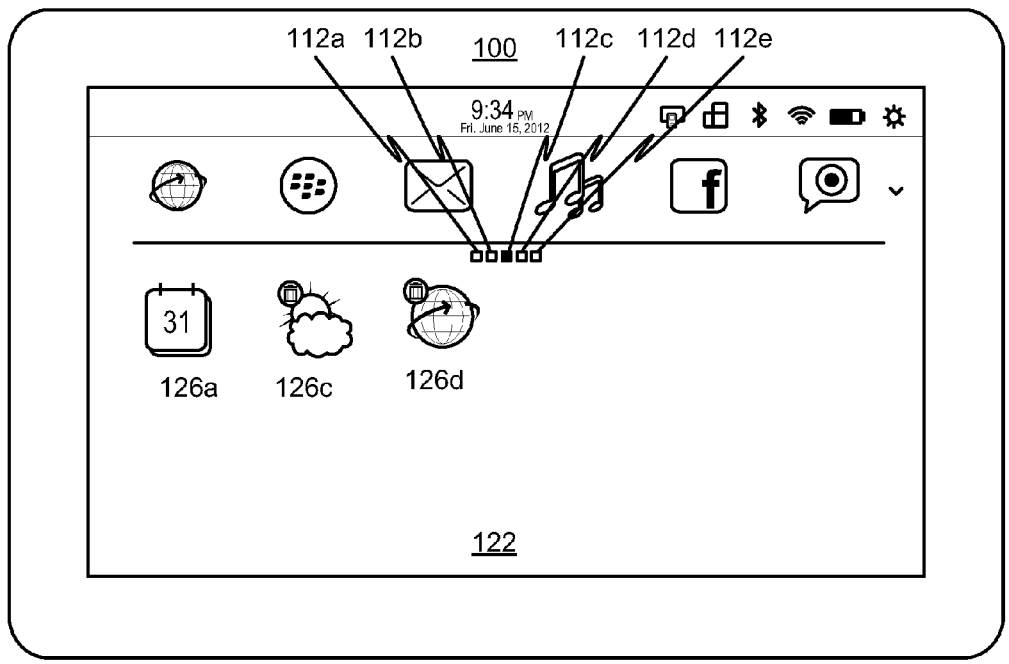

Once the rearrangement mode is entered, an icon can be selected and moved using a drag and drop gesture. It is contemplated that an icon may be selected with other gestures including a tap gesture. As depicted in FIGS. 7 and 8, a user can select an icon 126b by starting the drag gesture on the icon as depicted by contact point 128a. The selected icon can be dragged around the page by dragging the contact point. The user is able to move the icon directly to any of the pages, as opposed to simply adjacent pages, by dragging the icon into proximity of the page indicators 112a-d as depicted by arrow 128b. One of the page indicators 112d is selected based on the proximity of the touch gesture to the page indicators that is the closest page indicator to the selection touch input is selected. The user may drop, that is end the drag gesture as indicated by circle 128c, the icon on the selected page indicator 112d and the icon will be moved from the currently displayed page 122 to the page associated with the page indicator 112d the icon was dropped on. The icon 126b may be removed from the currently displayed page 122 and the remaining icons 126a, b, c can be rearranged as depicted in FIG. 9.

The page indicators 112a-d may be relatively small which could make it difficult to accurately select one of the page indicators to drop an icon onto. As depicted in FIG. 8, when the icon is in dragged, the selected page indicator can be highlighted to provide graphical feedback information. For example, an arrow 130 indicating which of the page indicators is currently selected can be provided as depicted in FIG. 8. The arrow may originate from the icon being moved, providing a more precise point for selecting one of the page indicators and assist the selection of the appropriate page. The arrow may be displayed when the icon is being moved regardless of if the icon is in close enough proximity to the page indicators to move the icon to one of the pages, as opposed to moving the icon within the same page. Alternatively the arrow may point to the selected page indicator when it is selected.

As previously described, when the GUI enters the rearrangement mode, a blank page may be added in order to provide a blank page to which icons can be moved. If an icon is moved to the blank page, as is the case in FIG. 8, another blank page may be added. A new page indicator 112e may be added for the blank page as shown in FIG. 9.

In the GUI described with reference to FIGS. 1 to 9, it is assumed that when an icon is dropped on, or moved to, the selected page indicator, the currently displayed page remains visible, as opposed to switching to display the page the icon was moved to. It is contemplated that the GUI may display the page the icon was moved to. Further it is assumed that the GUI remains in the rearrangement mode once the icon is moved in order to allow a user to easily rearrange multiple icons. It is contemplated that the GUI could return to the normal mode once an icon is moved.

Figure 10:
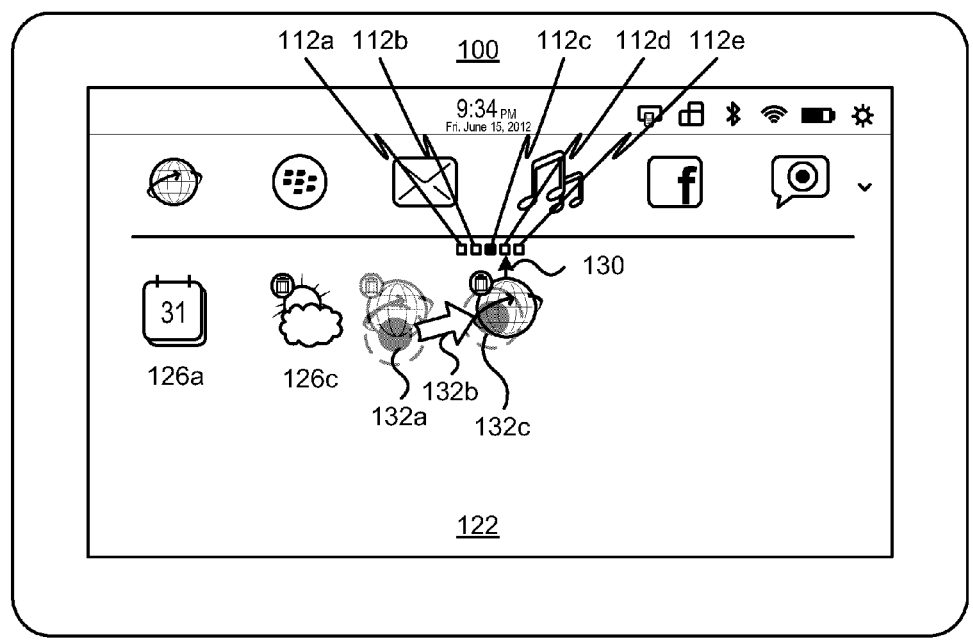
Figure 11:
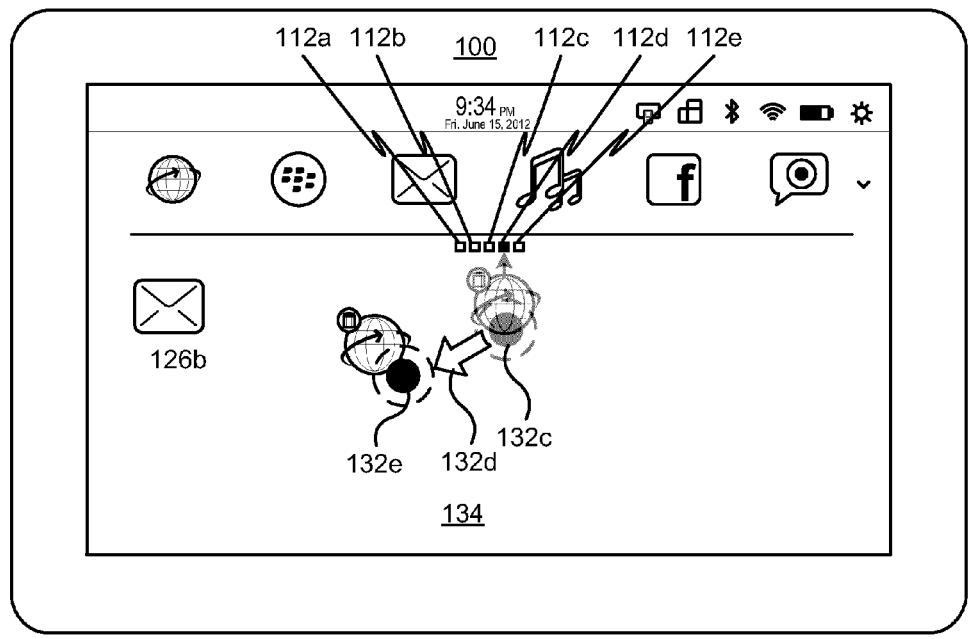
Figure 12:
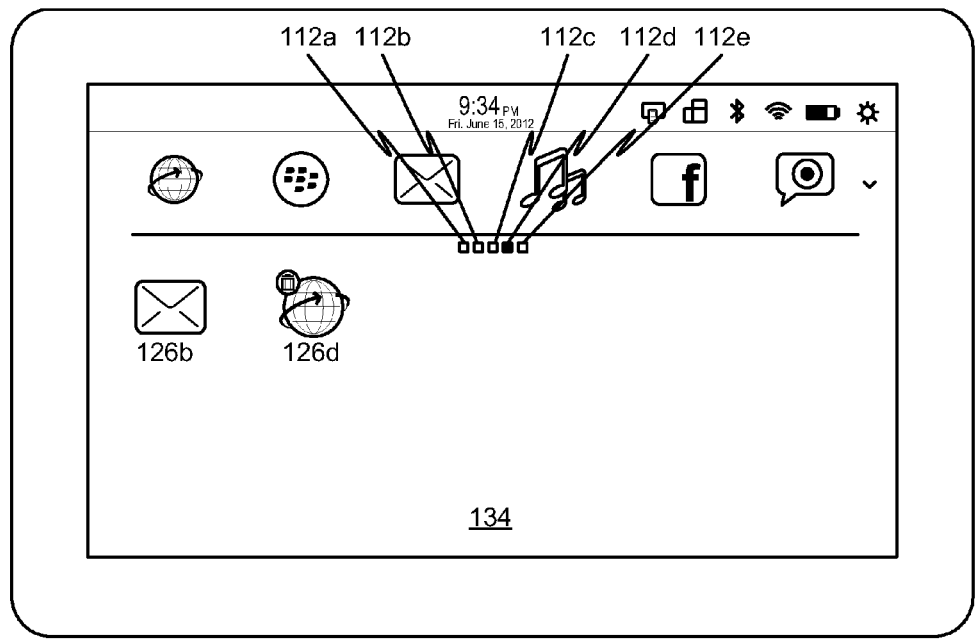
Figure 13:
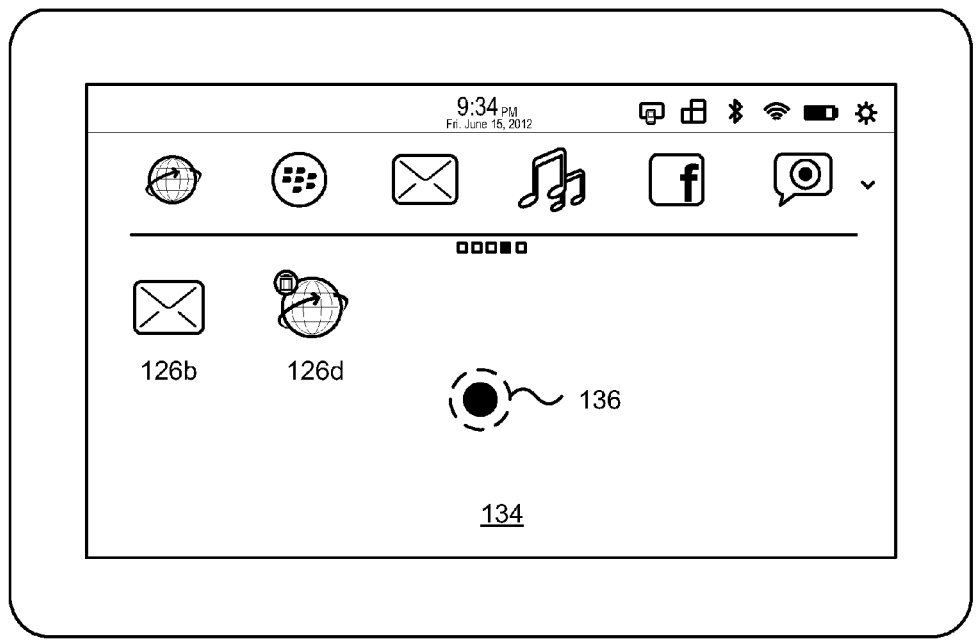

FIGS. 7 and 8 depicted dragging and dropping an icon onto a selected one of the page indicators in order to move the icon to the associated page. FIGS. 10 to 11 depict similar rearrangement functionality; however, rather than dropping the selected icon onto the page indicator, the icon is held over the selected page indicator for a threshold period of time. As depicted, the user initiates the drag gesture at contact point 132a to select the icon 126d to be moved. The drag gesture continues to drag the icon into proximity of the page indicator 112d as depicted by arrow 132b. As the icon is dragged into the proximity of the page indicators, an arrow 130 or other highlighting means, can be provided to indicate which of the page indicators is currently selected. Once the page indicator associated with the page the icon is desired to be moved to is selected, the drag gesture can be paused for a period of time as depicted by contact point 132c. If the gesture is held for a period of time greater than a threshold, for example 1 or 2 seconds, the GUI may switch to displaying the page 134 associated with the selected page indicator 112d as depicted in FIG. 11. As depicted, the selected icon 126d is moved to the newly displayed page 134. The drag gesture is maintained and can be continued from the hold contact point 132c to drag the icon about the page 134 as indicated by arrow 132d until the drag gesture is terminated at end point 132e. Once the drag gesture is terminated on the newly displayed page 134, the icons 126b, d can be arranged as depicted in FIG. 12. It is noted that the GUI may remain in the rearrangement mode. In order to return to the GUI's normal mode, a user may simply tap the screen as depicted by contact point 136 in FIG. 13, or the GUI may return to normal mode after a timeout expiring after a period of inaction. The GUI then exits the rearrangement mode and returns to the normal mode, which would remove any additional graphics added in the rearrangement mode, such as the trash icons added to the icons. Further, when returning to the normal mode, the GUI may also remove any pages that are not associated with any icons. In the figures, it is assumed that the page added when entering the rearrangement mode is not associated with any icons and as such it is removed, as well as the associated page indicator 112e, when returning to the normal mode.

As described above, icons can be conveniently moved and rearranged to any of the available pages through the page indicators. This may provide a more convenient, efficient, intuitive, or simply more preferred for personal preferences, manner for rearranging icons in the GUI.

Figure 14:
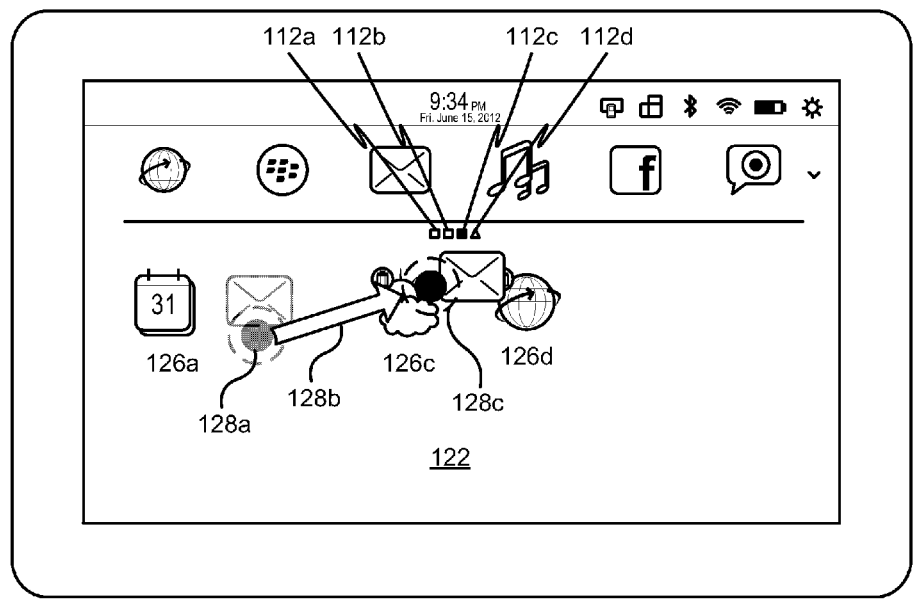
FIGS. 14 to 17 depict alternative page indicator highlighting in accordance with the current description.
Figure 15:
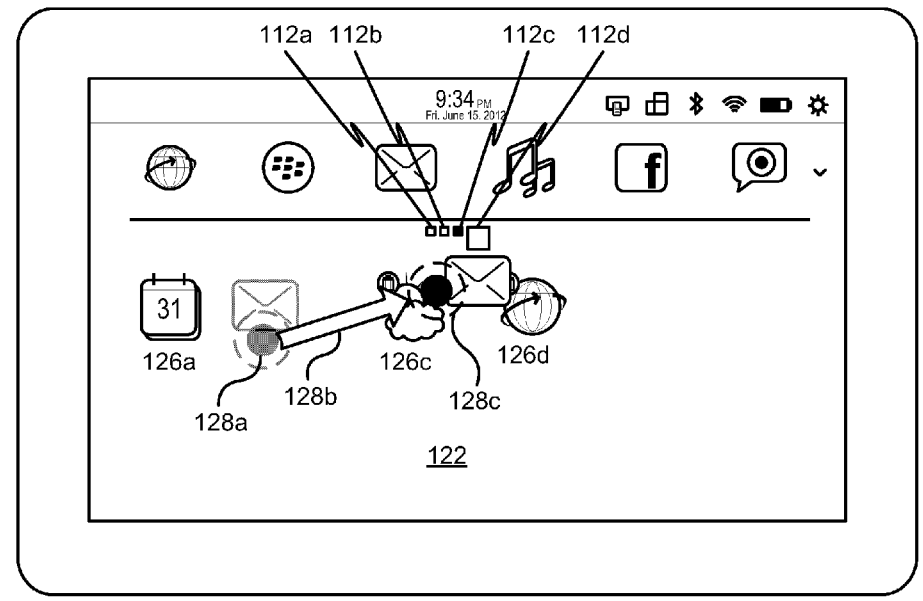
Figure 16:
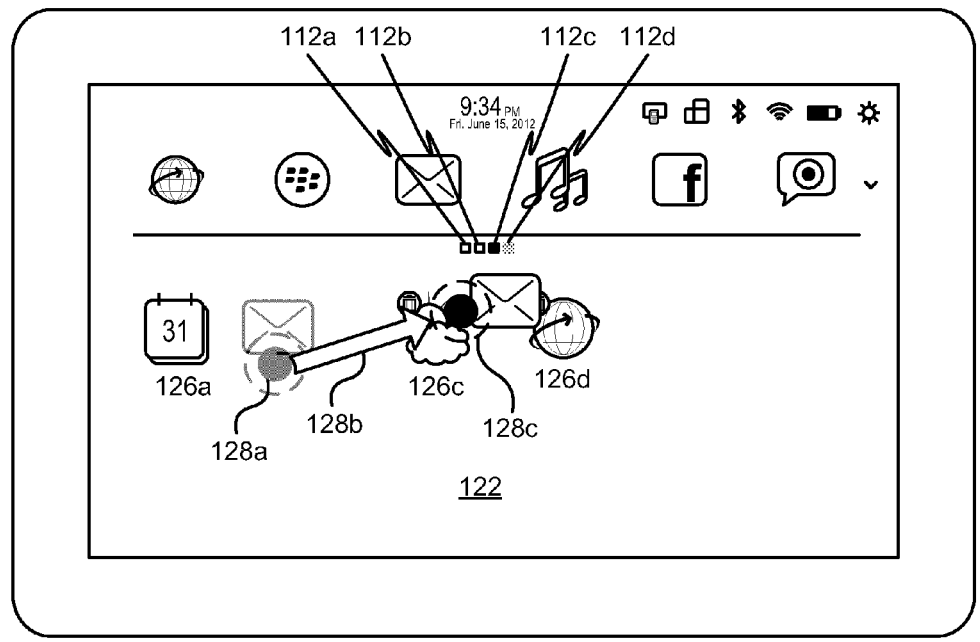
Figure 17:
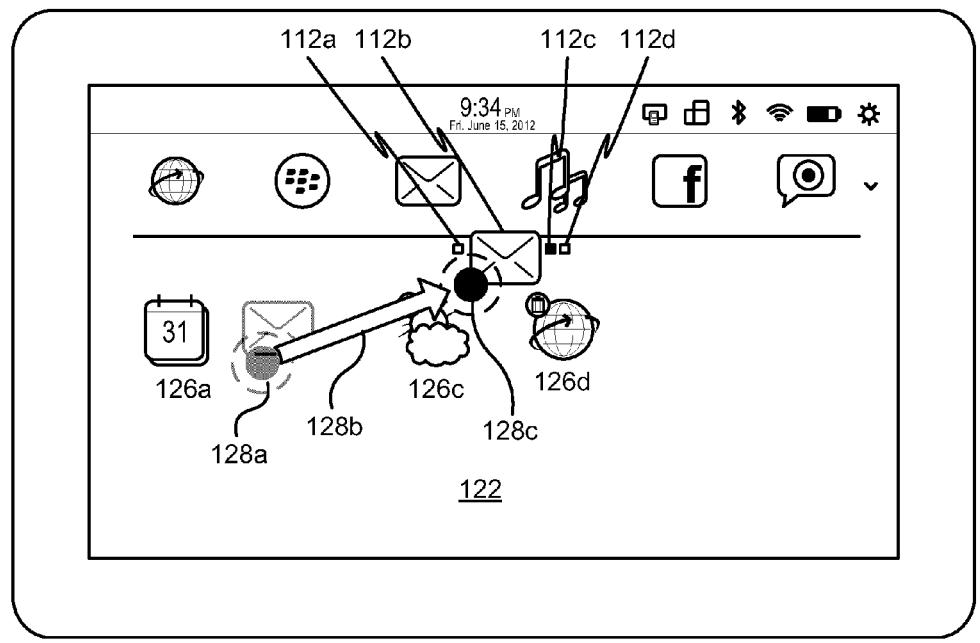

As described above, graphical information can be provided on the GUI in order to highlight which of the page indicators is currently selected. The graphical information was described as an arrow 130 that points to the currently selected page indicator, as the user dragged the icon about, the arrow could switch to point to the appropriate page indicator. It is contemplated that the page indicator that is currently selected, for example the page indicator that is closest to the contact point of the touch gesture, may be highlighted in additional or alternative manners. For example, the shape of the page indicator 112d may be changed as depicted in FIG. 14. Additionally or alternatively, the size of the page indicator 112d may be changed as depicted in FIG. 15. Additionally or alternatively the color of the page indicator 112d may be changed as depicted in FIG. 16. Alternatively text may be overlaid, or superimposed, to identify a name associated with the page to which the icon is being moved to may be displayed. Further, the graphic of the page indicator can be provided by the icon being moved, which would require adjustment of the spacing of the remaining page indicators as depicted in FIG. 17. It is noted that in FIG. 17, the selected page indicator is considered to be page indicator 112b and is depicted as being the icon 126b that is being moved. The other page indicators 112a, 112c, 112d are adjusted to appear on the appropriate side of the icon 126b.

Figure 18:
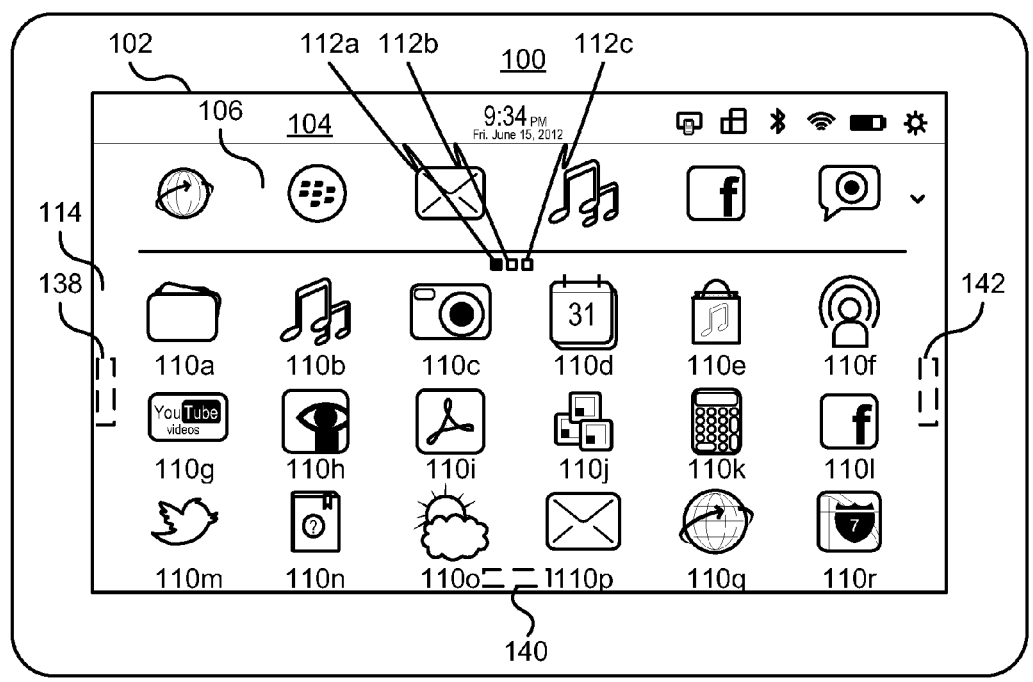
FIG. 18 depicts alternative placements of page indicators.

The above description and figures have depicted the page indicators 112a-e as being located along a top of the pages. It is contemplated that the page indicators could be located in various locations on the GUI. As depicted in FIG. 18, the page indicators may be located, for example, on the left side 138 of the GUI, on the bottom of the GUI 140 or on the right side of the GUI 142.

The above has described the operation of the icon rearrangement with regards to a particular GUI. It will be appreciated that changes to the specifics of the GUI, such as the location of elements, the graphical representation of elements, as well as the presence or absence of elements can be made without changing the rearrangement functionality described herein. Although it is possible for different GUIs to provide similar elements, such as icons, pages and page indicators in different arrangements and graphical styles, the rearrangement of icons onto different pages is possible by dragging an icon to an appropriate or desired page indicator as described herein.

Figure 19:
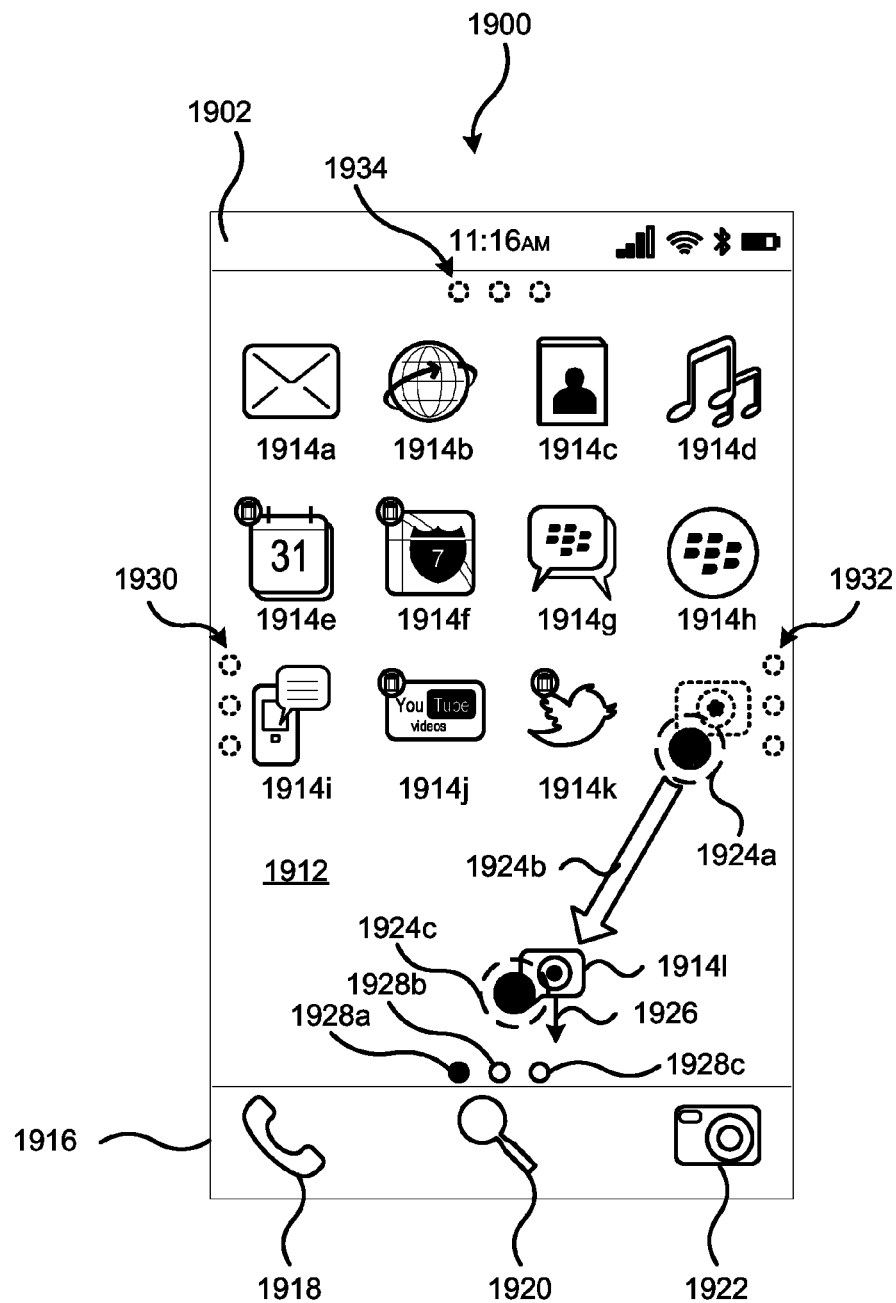
FIG. 19 depicts rearranging an icon in a further GUI.

FIG. 19 depicts an alternative illustration of a GUI providing rearranging of an icon. The GUI 1900 comprises a top information bar 1902 which can display various information and icons. The information bar 1902 is depicted as displaying the time, as well as various status information. The GUI 1900 displays a page 1912 which includes a plurality of icons 1914a-l. The GUI may include different pages with icons that are not currently displayed. The GUI may further comprise a lower access bar 1916 for accessing frequently used applications or functions presented by icons 1918, 1920, 1922. It is assumed that the GUI is in the rearrangement mode, and may provide some visual cues of the rearrangement mode such as the trash can identifiers on icons 1914e, f, j, k. The user may select an icon 1914l and drag the icon towards page indicators 1928a, b, c as depicted by the drag gesture 1924a, b, c. As the icon is dragged into the proximity of the page indicators, an arrow 1926 may be provided to highlight which of the page indicators is currently selected. The icon 1914l may be moved to the page associated with the selected page indicator as described above. Further, as described above, the page indicators may be located at different locations of the GUI. For example the page indicators may be located on a left side 1930 of the GUI, a right side 1932 of the GUI or a top 1934 of the GUI.

Figure 20:
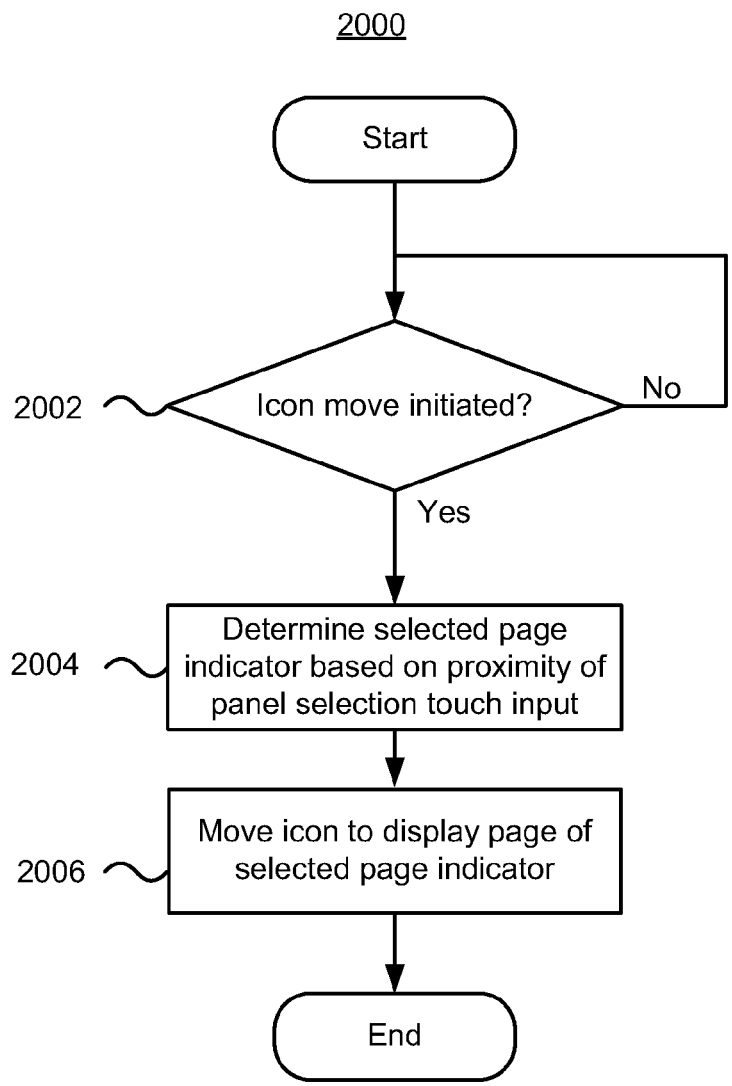
FIG. 20 depicts a method of rearranging icons in accordance with the present disclosure.

FIG. 20 depicts a method of rearranging icons on a touch sensitive device. The method 2000 begins with determining if an icon move has been initiated (2002). The icon move may be initiated in various ways, including a gesture such as tapping an icon, tapping and holding an icon for a drag gesture, specifying a move location with a touch gesture or making a selection from a menu. If no icon move has been initiated (No at 2002) the method may return and wait for an icon move to be initiated. If an icon move has been initiated (Yes at 2002), the method determines a selected page indicator based on proximity of a page selection touch input (2004). The selected page indicator may be determined in various ways. For example, the page indicator that is closest to the contact point of the selection input may be selected. Alternatively, the closest page indicator to the contact point in a single axis may be selected. Additionally, the proximity to a page indicator may be based on a threshold or set value, such as distance or radius so that the page selection touch input needs to be within the threshold or radius distance of the page indicator in order to select the page indicator. Once one of the page indicators is selected, the icon may be moved to the page associated with the selected page indicator (2006). The icon may be moved if the icon move is terminated. For example, if the icon is moved using a drag gesture, the move may be terminated by ending the gesture, or 'dropping' the icon on the selected page indicator. The icon may also be moved if the page selection touch input is maintained in proximity to the same page indicator for a period of time greater than a threshold. That is, if the user 'hovers' or holds the gesture selecting the page indicator, the icon may be moved to the selected page indicator. Once the icon is moved to the new page, it can be removed from the previous page. When the icon is moved to the new page, the GUI may continue displaying the original page, without the moved icon, or may switch to display the page with the moved icon. Alternatively, the movement of an icon may also be performed in a two finger gesture, wherein the icon is selected and held by a first finger input and the page indicator is selected by a second finger input providing to identify the selected page indicator.

Figure 21:
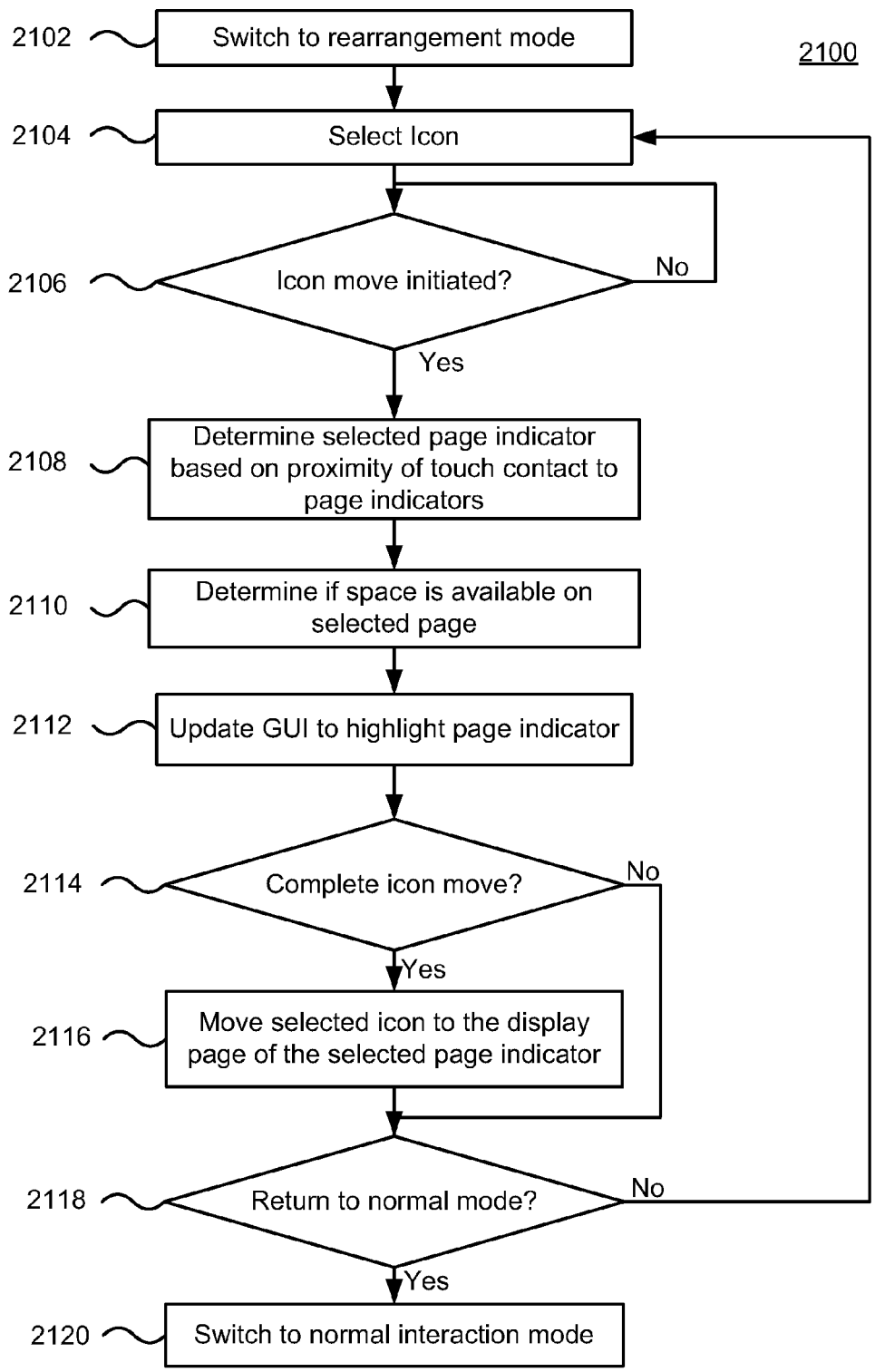
FIG. 21 depicts a further method of rearranging icons in accordance with the present disclosure.

FIG. 21 depicts an alternative method of rearranging icons on a touch sensitive device. The method 2100 begins with switching the GUI to a rearrangement mode (2102). The rearrangement mode allows a user to move and delete icons from the GUI. Once in the rearrangement mode, an icon is selected (2104) and it is determined if an icon move has been initiated (2106). If the icon move has not been initiated (No at 2106) the method waits until an icon move is determined to be initiated. Once an icon move has been initiated (Yes at 2106) a selected page indicator is determined based on the proximity of a contact point to the page indicators (2108). It can then be determined if there is space available on the selected page for the icon to be moved (2108). If there is not sufficient space to add the icon to, identification that one of the icons on the selected page will be moved to the next page as a result of the additional of the icon. The GUI is updated to provide graphical feedback information in the form of an indicator or user aid, such as by highlighting the selected page indicator or providing additional visual cues to the user in addition to the icon (2112). The indicator graphical feedback information may change if space is, or is not, available on the selected page, for example a green arrow or icon may identify that space is available, where as a red arrow or icon would identify that space is not available and may result in a cascade movement of icons onto other pages. The method then determines if the icon move is completed (2114) by the completion of the movement process, for example the completion of the movement of the icon gesture. If the icon move is not to be completed (No at 2114), for example because the move was cancelled, the method may determine if the GUI should return to the normal interaction mode (2118). If the icon move is to be completed (Yes at 2114), the method moves the selected icon to the page that is associated with the selected page indicator (2116). The GUI may switch to display the selected page with the new icon or may remain on the original page to allow additional icon movements. The method may then determine if the GUI should return to the normal mode (2118), and if it should (Yes at 2118) the GUI is returned to the normal interaction mode (2120). If the GUI should not be placed in the normal interaction mode (No at 2120), the method may return to allow selection of another icon (2104).

It will be appreciated that the different user interactions for the method above, for example, indicating to switch to a rearrangement mode, selecting an icon to move, initiating an icon move, indicating one of the page indicators and indicating that the icon move should be completed may be provided by one or more gestures. As an example of a single gesture, a user may make and hold an initial contact on an icon. Once the contact is held for a threshold period of time, the GUI may enter the rearrangement mode and the icon that is being held may be selected. The user may then begin the dragging motion of the gesture which would indicate the icon is to be moved and then the contact could be released once the appropriate or desired page indicator is highlighted to indicate that the icon move should be completed.

Figure 22:
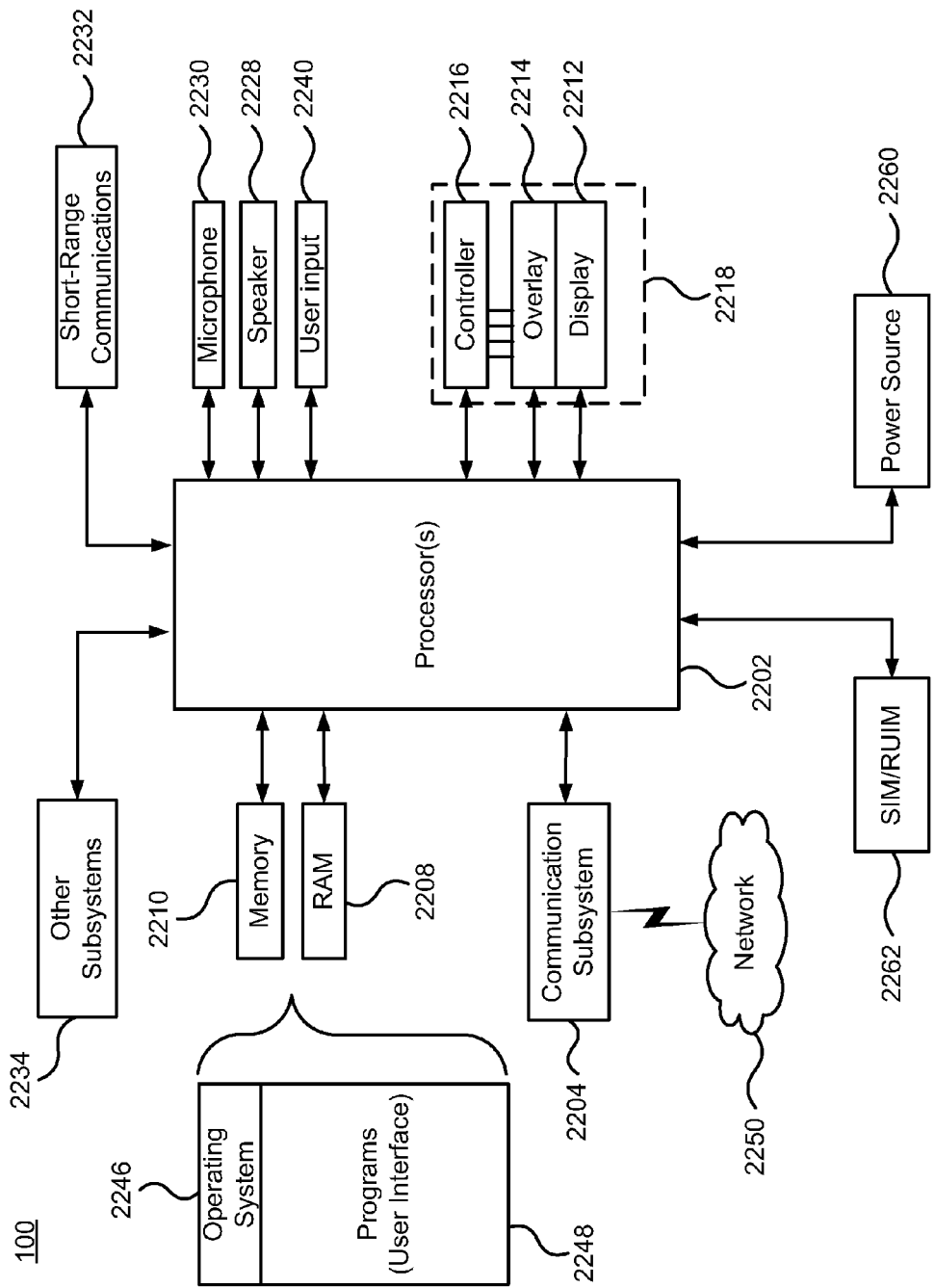
FIG. 22 depicts components of an electronic device capable of rearranging icons in accordance with the present disclosure.

FIG. 22 is a schematic depiction of an example electronic device capable of rearranging GUI icons as described herein. As shown by way of example in FIG. 22, the electronic device 100, includes a processor (or microprocessor) 2202 for executing instructions, including instructions for providing one or more applications, memory in the form of flash memory 2210 and RAM 2208 (or any equivalent memory devices) for storing an operating system 2246 and one or more applications, components or functionalities 2248 providing the graphical user interface with which the user interacts with the device, including functionality for rearranging icons to any page as described herein. The processor receives power from a power supply 2260, which may be a direct connection or provided by a battery source.

As shown by way of example in FIG. 22, the electronic device 100 may include a communication subsystem 2204 which provides radiofrequency (RF) transceiver to communicate through a wireless network 2250. The electronic device 100 may be in a portable form factor such as a smart phone, tablet, netbook, laptop, ultrabook, portable computing device or an integrated mobile computer device. The electronic device 100 may access wired or wireless networks to transmit and retrieve data. The RF transceiver for communication with a wireless network 2250 using a wireless communication protocols such as, for example but not limited to, GSM, UMTS, LTE, HSPDA, CDMA, W-CDMA, Wi-MAX, Wi-Fi etc. A subscriber identity module (SIM) card 2262 may be provided depending on the access technology supported by the device. The communication subsystem 2204 may also provide wired communication through a network.

Optionally, where the device is a voice-enabled communications device such as, for example, a tablet, smart-phone or cell phone, the device would further include a microphone 2230 and a speaker 2228. Short-range communications 2232 is provided through wireless technologies such as Bluetooth™ or wired Universal Serial Bus™ connections to other peripheries or computing devices or by other device sub-systems 2234 which may enable access tethering using communications functions of another mobile device. In a tethering configuration the electronic device 100 may provide the network information associated with the tethered or master device to be used to access the network. The device

100 may optionally include a Global Positioning System (GPS) receiver chipset or other location-determining subsystem.

The operating system 2246 and the software components that are executed by the microprocessor 2202 are typically stored in a persistent store such as the flash memory 2210, which may alternatively be a read-only memory (ROM) or similar storage element (not shown). Those skilled in the art will appreciate those portions of the operating system 2246 and the software components, such as specific device applications, or parts thereof, may be temporarily loaded into a volatile store such as the RAM 2208. Other software components can also be included, as is well known to those skilled in the art.

User input 2240 may be provided by integrated input devices such as a keyboard, touchpad, touch screen, mouse, camera or positing apparatus to actuate transitions. The electronic device 100 may have an integrated touch-sensitive display 2218 having a display screen 2212, with a touch-sensitive overlay 2214 coupled to a controller 2216 for enabling interaction with the electronic device 100. The display portion of the electronic device 100 may not necessarily be integrated but may be coupled to the electronic device 100. Although a touch-sensitive GUI interface has been described the described system and methods may be applied to gesture based interfaces, for example by using a camera input or three-dimensional input devices.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

What is claimed is:

1. A method of rearranging icons between a plurality of pages of a graphical user interface (GUI), each page associated with a respective one of a plurality of page indicators displayed in the GUI, the GUI displaying a single page at a time, the method comprising:
    placing the GUI in a rearrangement mode;
    while in rearrangement mode:
    adding a blank page to the plurality of pages of the GUI and a blank page indicator to the plurality of page indicators displayed in the GUI in response to placing the GUI in the rearrangement mode, the blank page for use in rearranging the icons;
    detecting an initiation of an icon move of a selected icon displayed on a current page, wherein the initiation of the icon move comprises a start touch contact of a drag gesture that includes a page selection input;
    determining a selected page indicator of the plurality of page indicators when the drag gesture of the page selection input is dragged within a predefined distance threshold of one of the plurality of page indicators, the selected page indicator corresponding to a selected one of the plurality of pages;
    providing a graphical feedback information highlighting the selected page indicator of the plurality of page indicators;
    determining if the selected page provides sufficient space for the selected icon to be moved to, providing a first graphical feedback information when there is sufficient space, and when there is not sufficient space the providing a second graphical feedback information that is different from the first graphical feedback information;
    wherein the first and second graphical feedback information comprises one or more of:
        displaying an arrow pointing to the selected page indicator;
        changing a shape of the selected page indicator;
        changing a color of the selected page indicator;
        changing a size of the selected page indicator;
        displaying a title associated with the selected page indicator; and
        replacing the selected page indicator with the selected icon;
    moving the selected icon to the selected page associated with the selected page indicator comprising:
        enabling positioning of the selected icon on the selected page while the drag gesture is maintained without finalizing a position of the selected icon on the selected page by switching the GUI to replace a display of the current page with a display of the selected page including the selected icon on the selected page associated with the selected page indicator in response to the selected page indicator being selected by maintaining the drag gesture of the page selection input for an amount of time above a predetermined threshold time; and
        finalizing the position of the selected icon on the selected page when the drag gesture ends, the finalizing causing the selected icon to be removed from the current page on which the start touch contact of the drag gesture was detected;
    after the finalizing, switching the GUI to replace the display of the selected page with the display of the current page on which the start touch contact of the drag gesture was detected;
    after the switching the GUI to replace the display of the selected page with the display of the current page, remaining in the rearrangement mode to allow additional icon movements from the current page; and
    exiting the rearrangement mode upon detection of at least one of an indication to return the GUI to a normal interaction mode and expiration of a timeout period.

2. The method of claim 1, wherein the rearrangement mode provides a visual indication that the GUI is in the rearrangement mode, wherein
    the drag gesture is initiated with a hold touch for a period of time greater than a threshold, the hold touch placing the GUI in the rearrangement mode.

3. The method of claim 2, further comprising:
    detecting an initiation of a second icon move of a second selected icon; and
    moving the second selected icon to a second selected page.

4. The method of claim 1, further comprising rearranging the icons, including the selected icon, on the page associated with the selected page indicator.

5. The method of claim 1, further comprising adding a second blank page and a second blank page indicator to the GUI if the selected icon is moved to the blank page.

6. The method of claim 1, further comprising removing the blank page and the blank page indicator from the GUI upon exiting the rearrangement mode if no icon is moved to the blank page.

7. An electronic device comprising:
a touch-sensitive display;
a processor for executing instructions; and
a memory storing instructions, the instructions when executed by the processor configuring the electronic device to provide:
a graphical user interface (GUI) comprising a plurality of icons arranged on a plurality of pages, each page associated with a respective one of a plurality of page indicators displayed in the GUI, the GUI displaying a single page at a time; and
icon rearrangement functionality comprising:
placing the GUI in a rearrangement mode;
while in rearrangement mode:
adding a blank page to the plurality of pages of the GUI and a blank page indicator to the plurality of page indicators displayed in the GUI in response to placing the GUI in the rearrangement mode, the blank page for use in rearranging the icons;
detecting an initiation of an icon move of a selected icon displayed on a current page, wherein the initiation of the icon move comprises a start touch contact of a drag gesture that includes a page selection input;
determining a selected page indicator of the plurality of page indicators when the drag gesture of the page selection input is dragged within a predefined distance threshold of one of the plurality of page indicators the selected page indicator corresponding to a selected one of the plurality of pages;
providing a graphical feedback information highlighting the selected page indicator of the plurality of page indicators;
determining if the selected page provides sufficient space for the selected icon to be moved to, providing a first graphical feedback information when there is sufficient space, and when there is not sufficient space providing a second graphical feedback information that is different from the first graphical feedback information;
wherein the first and second graphical feedback information comprises one or more of:
displaying an arrow pointing to the selected page indicator;
changing a shape of the selected page indicator;
changing a color of the selected page indicator;
changing a size of the selected page indicator;
displaying a title associated with the selected page indicator; and
replacing the selected page indicator with the selected icon;
moving the selected icon to the selected page associated with the selected page indicator comprising:
enabling positioning of the selected icon on the selected page while the drag gesture is maintained without finalizing a position of the selected icon on the selected page by switching the GUI to replace a display of the current page with a display of the selected page including the selected icon on the selected page associated with the selected page indicator in response to the selected page indicator being selected by maintaining the drag gesture of the page selection input for an amount of time above a predetermined threshold time; and
finalizing the position of the selected icon on the selected page when the drag gesture ends, the finalizing causing the selected icon to be removed from the current page on which the start touch contact of the drag gesture was detected;
after the finalizing, switching the GUI to replace the display of the selected page with the display of the current page on which the start touch contact of the drag gesture was detected;
after the switching the GUI to replace the display of the selected page with the display of the current page, remaining in the rearrangement mode to allow additional icon movements from the current page; and
exiting the rearrangement mode upon detection of at least one of an indication to return the GUI to a normal interaction mode and expiration of a timeout period.

8. The electronic device of claim 7, wherein the rearrangement mode provides a visual indication that the GUI is in the rearrangement mode, wherein the drag gesture is initiated with a hold touch for a period of time greater than a threshold, the hold touch placing the GUI in the rearrangement mode.

9. The electronic device of claim 8, wherein the icon rearrangement functionality further comprises rearranging the icons, including the selected icon, on the page associated with the selected page indicator.

10. The electronic device of claim 7, wherein the icon rearrangement functionality further comprises adding a second blank page and a second blank page indicator to the GUI if the selected icon is moved to the blank page.

11. The electronic device of claim 7, wherein the icon rearrangement functionality further comprises removing the blank page and the blank page indicator from the GUI upon exiting the rearrangement mode if no icon is moved to the blank page.

12. A non-transitory computer readable medium storing instructions for configuring an electronic device to provide a method of rearranging icons between a plurality of pages of a graphical user interface (GUI), each page associated with a respective one of a plurality of page indicators displayed in the GUI, the GUI displaying a single page at a time, the method comprising:
placing the GUI in a rearrangement mode;
while in rearrangement mode:
adding a blank page to the plurality of pages of the GUI and a blank page indicator to the plurality of page indicators displayed in the GUI in response to placing the GUI in the rearrangement mode, the blank page for use in rearranging the icons;
detecting an initiation of an icon move of a selected icon displayed on a current page, wherein the initiation of the icon move comprises a start touch contact of a drag gesture that includes a page selection input;
determining a selected page indicator of the plurality of page indicators when the drag gesture of the page selection input is dragged within a predefined distance threshold of one of the plurality of page indicators the selected page indicator corresponding to a selected one of the plurality of pages;
providing a graphical feedback information highlighting the selected page indicator of the plurality of page indicators;

determining if the selected page provides sufficient space for the selected icon to be moved to, providing a first graphical feedback information when there is sufficient space, and if when there is not sufficient space providing a second graphical feedback information that is different from the first graphical feedback information;

wherein the first and second graphical feedback information comprises one or more of:
  displaying an arrow pointing to the selected page indicator;
  changing a shape of the selected page indicator;
  changing a color of the selected page indicator;
  changing a size of the selected page indicator;
  displaying a title associated with the selected page indicator; and
  replacing the selected page indicator with the selected icon;

moving the selected icon to the selected page associated with the selected page indicator comprising:
  enabling positioning of the selected icon on the selected page while the drag gesture is maintained without finalizing a position of the selected icon on the selected page by switching the GUI to replace a display of the current page with a display of the selected page including the selected icon on the selected page associated with the selected page indicator in response to the selected page indicator being selected by maintaining the drag gesture of the page selection input for an amount of time above a predetermined threshold time; and finalizing the position of the selected icon on the selected page when the drag gesture ends, the finalizing causing the selected icon to be removed from the current page on which the start touch contact of the drag gesture was detected;

after the finalizing, switching the GUI to replace the display of the selected page with the display of the current page on which the start touch contact of the drag gesture was detected;

after the switching the GUI to replace the display of the selected page with the display of the current page remaining in the rearrangement mode to allow additional icon movements from the current page; and exiting the rearrangement mode upon detection of at least one of an indication to return the GUI to a normal interaction mode and expiration of a timeout period.

13. The non-transitory computer readable medium of claim 12, wherein the method further comprises adding a second blank page and a second blank page indicator to the GUI if the selected icon is moved to the blank page.

14. The non-transitory computer readable medium of claim 12, wherein the method further comprises removing the blank page and the blank page indicator from the GUI upon exiting the rearrangement mode if no icon is moved to the blank page.

* * * * *

UNITED STATES PATENT AND TRADEMARK OFFICE
CERTIFICATE OF CORRECTION

PATENT NO. : 9,916,060 B2  
APPLICATION NO. : 13/542396  
DATED : March 13, 2018  
INVENTOR(S) : Altaf Hosein Page 1 of 1

It is certified that error appears in the above-identified patent and that said Letters Patent is hereby corrected as shown below:

In the Claims

In Column 10, Line 11, delete "the", therefor.

In Column 13, Line 4, delete "if", therefor.

Signed and Sealed this  
Twenty-ninth Day of December, 2020

Andrei Iancu  
*Director of the United States Patent and Trademark Office*